United States Patent [19]

Waddill et al.

[11] Patent Number: 5,250,632
[45] Date of Patent: Oct. 5, 1993

[54] HEIMD-CONTAINING POLYETHERAMINE CURATIVE FOR FLEXIBLE, TOUGHENED PRODUCTS

[75] Inventors: Harold G. Waddill; Wei-Yang Su; Michael Cuscurida; Terry L. Renken, all of Austin, Tex.

[73] Assignee: Texaco Chemical Company, White Plains, N.Y.

[21] Appl. No.: 928,583

[22] Filed: Aug. 13, 1992

[51] Int. Cl.$^5$ ................ C08G 59/40; C08G 59/62; C08G 65/00
[52] U.S. Cl. ................... 525/407; 528/111; 528/367; 525/504
[58] Field of Search ............... 528/111, 367; 525/504, 525/407

[56] References Cited

U.S. PATENT DOCUMENTS 3,316,185  4/1967  Reinking ...................... 528/111
4,190,719  2/1980  Samejima et al. ............ 528/111

*Primary Examiner*—Frederick F. Krass
*Attorney, Agent, or Firm*—James L. Bailey; Kenneth R. Priem; Cynthia L. Kendrick

[57] ABSTRACT

Disclosed is a novel polyetherdiamine comprising an aminated, alkoxylated 1-2'-hydroxyethyl-2-imidazolidone represented by the formula:

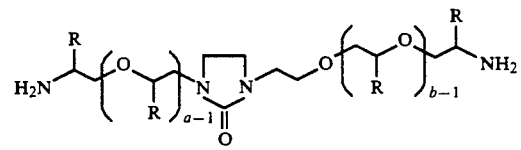

where R is H or an alkyl group of from 1 to 16 carbon atoms and $a+b=n$, wherein n is a number from about 2 to 80, and to its use in epoxy resin curing systems to produce compositions having improved strength and flexibility properties compared with currently available polyoxyalkylenediamine curatives of equivalent weight.

4 Claims, No Drawings

HEIMD-CONTAINING POLYETHERAMINE CURATIVE FOR FLEXIBLE, TOUGHENED PRODUCTS

CROSS-REFERENCE

This application is related to U.S. application Ser. No. 07/928,582, filed of even date.

BACKGROUND OF THE INVENTION

1. Field of the Invention

This invention relates to polyetherdiamines and, more particularly, this invention relates to novel curing compositions comprising aminated, alkoxylated derivatives of hydroxyalkyl-2-imidazolidones, prepared as described in copending application Ser. No. 07/928,582 incorporated herein by reference in its entirety. The hydroxyalkyl-2-imidazolidone initiator is reacted with an alkylene oxide and the resulting polyol subsequently undergoes reductive amination.

These novel polyetherdiamines, termed HEIMD-containing polyetheramines, exhibit improved elastomeric properties and can be used alone or combined with known polyoxyalkyleneamine curing agents and reacted with multifunctional epoxy resins to produce systems which possess a level of flexibility and toughness not usually achieved. Due to the unique structure of these amines, which contain cyclic urea, cured systems are more resistant to impact and are more extensible than are systems cured with blends of other polyetheramines of equivalent weight.

2. Related Art

It is known in the art that compounds with primary and secondary amine functions can be used as reactive hardeners in epoxy resin formulations employed for protective coatings, electrical embodiments, adhesives, etc. Many of the known polyethylenediamines have been used for such applications. Grayson et al., ed., *Kirk-Othmer Encyclopedia of Chemical Technology*, Third Edition, Vol 7, p. 593.

It is also known in the art that the utility of the polyethylenepolyamines as curing agents or hardeners for epoxy resin compositions can be extended through the use of numerous derivatives. For example, hydroxy-substituted amines can be prepared by the reaction of a pclyethylenepolyamine with ethylene oxide or propylene oxide. Cyancethylated polyethylenepolyamines represent another useful class cf derivatives.

Substituted imidazolines prepared by the condensation of polyethylenepolyamines with carboxylic acids or carboxylic acid derivatives have also been employed as epoxy curing agents. These curing agents are proposed for use in aqueous emulsion systems and to provide coatings with improved hydrolytic stability.

Polyethylenepolyamines can be condensed with di- and trifunctional fatty carboxylic acids obtained from the thermal polymerization of vegetable oil fatty acids to produce liquid, reactive polyamide resins. Various polyethylenepolyamines may be used in the preparation of polyamides, which may be characterized as low molecular weight, highly branched, highly viscous polymers with high amine functionality. The liquid polyamides often provide substantial improvements in flexibility of cured composites, leading to higher impact resistance and flexural strength.

Other derivatives of polyethylenepolyamines can be prepared by reaction with $\alpha,\beta$-unsaturated esters to reduce viscosities. Viscosity reduction can also be effected by blending the polyamides with the higher polyethylenepolyamines.

Other derivatives are prepared by reacting polyethylenepolyamines with an aliphatic, hydroxyl-containing carboxylic acid, with tall oil fatty acids and with keto-acids.

The products of polyethylenepolyamines and aromatic monoisocyanates, lower aliphatic aldehydes, epoxidized fatty nitriles and propylene sulfide are also useful as epoxy curing agents.

There is always a need in the field of epoxy curing agent for compounds which provide improvements in toughness (resistance to impact) and flexibility (elongation) of cured compositions, as measured by tests which are well-known in the art.

It would represent a substantial advance in the art if a curing agent were commercially available which had distinct, measurable improvements in strength properties, i.e., resistance to impact and elongation.

It would also be very useful in the art if such a curing agent could be used alone or blended with other curing agents in a predictable way to modify properties of cured systems.

SUMMARY OF THE INVENTION

In accordance with the foregoing the present invention is directed to an epoxy resin curative which comprises an aminated, alkoxylated derivative of 1-2'-hydroxyethyl-2-imidazolidone. The amine is represented by the formula:

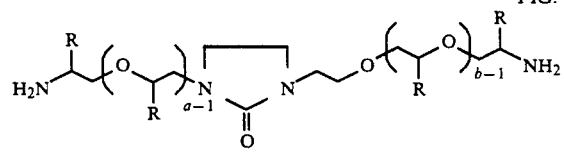

FIG. 1 wherein R is H or an alkyl group of from 1 to 16 carbon atoms, and $a+b=n$, wherein n is from about 2 to 80. These HEIMD-containing polyetheramines are prepared as described in copending Ser. No. 07/928,582.

The HEIMD-containing polyetheramines may be reacted with multifunctional epoxy resins to produce materials having a degree of toughness and flexibility substantially improved over anything available in the art.

The level of toughness and flexibility developed in systems using these HEIMD derivatives has previously been quite difficult to attain. The significant improvements are believed to be due in part to the unique structure of these compounds, which comprises the incorporation of the cyclic urea group(s). Systems cured with these aminated alkoxylated HEIMDs are more resistant to impact and more extensible than are systems cured with blends of polyetheramines of equivalent weight as will be demonstrated in the examples. They are also efficient modifiers of less flexible epoxy systems.

These HEIMD-containing polyetheramine curatives will provide many new possibilities in epoxy, polyurea RIM and polyamide applications.

DETAILED DESCRIPTION OF THE PREFERRED EMBODIMENT

In the instant invention it has been discovered that the aminated alkoxylated 1-2'-hydroxyethyl-2- imidazolidone (HEIMD) derivatives having the structure identified in FIG. have properties which make them particularly valuable as curing agents.

They can be used in epoxy resin compositions, such as films, castings, adhesives, etc., comprising a vicinal polyepoxide having an epoxide equivalency greater than about 1.8 and a curing amount of a curing agent such as the HEIMD amine curing agent of this invention.

These HEIMD amine derivatives may be used as the sole epoxy curative or blended with other known curatives, such as, for example, polyoxyalkyleneamines to modify resin properties.

As mentioned above, the aminated, alkoxylated derivative of HEIMD may be used as a curing agent alone or in combination with a polyoxyalkyleneamine, for example, including, but not limited to polyoxyalkylenediamines of the JEFFAMINE® D-series as exemplified by the structural formula:

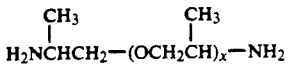

where x is a number from about 2 to 35 and includes, for example, JEFFAMINE® D-230, JEFFAMINE® D-400 and JEFFAMINE® D-2000. The HEIMD derivative may also be used in combination with a polyoxyalkylenediamine of the EDR-series represented by the formula:

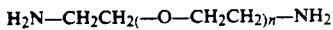

where n=2 or 3, represented by JEFFAMINE® EDR-148 or EDR-192.

Generally, the JEFFAMINE® polyoxyalkylenepolyamines employed in conjunction with the curing agents of this invention will have molecular weights of about 148 or more and, preferably will have molecular weights ranging from about 230 to about 2000. All of the above JEFFAMINE® products are marketed by the Texaco Chemical Company, Houston, Tex.

The HEIMD-containing polyetheramines can be combined, not only with polyoxyalkyleneamines such as those of the JEFFAMINE® series mentioned above, but with a variety of commercially available amines. Suitable examples are ethyleneamines, including, but not limited to diethylenetriamines, triethylenetetramine, etc., and aromatic or cycloaliphatic amines and catalytic amines such as imidazoles.

Examples 2, 2a, 2b, 2c, 3 and 3a compare properties of systems cured with the HEIMD-containing polyetheramine with properties of systems cured with JEFFAMINE® amines or blends of commercially available amines. The data confirms significant improvements in strength and flexibility.

When the curing agent comprises a blend of the HEIMD-containing polyetheramine of this invention and another polyoxyalkylenepolyamine, usually the polyetherdiamine will comprise from about 15 to about 100 wt% of the compound with the balance being the polyoxyalkylenepolyamine.

Generally, the amine-cured vicinal polyepoxide-containing compositions are organic materials having an average of at least 1.8 reactive 1,2-epoxy groups per molecule. These polyepoxide materials can be monomeric or polymeric, saturated or unsaturated, aliphatic, cycloaliphatic, aromatic or heterocyclic, and may be substituted if desired with other substituents besides the epoxy groups, e.g., hydroxyl groups, ether radicals, aromatic halogen atoms and the like. These vicinal polyepoxide-containing compounds typically are of an epoxy equivalent weight (EEW) of 150 to 250. Preferably the base resin, which has an epoxy equivalent weight of from 175 to 195, is derived from condensing epichlorohydrin with 4,4'-isopropylidenediphenol or 2,2-bis(p-hydroxyphenyl)propane to form 2,2-bis(p-2,3 epoxy propoxyphenyl)propane, a derivative of Bisphenol A.

Preferred polyepoxides are those of glycidyl ethers prepared by epoxidizing the corresponding allyl ethers or reacting, by known procedures, a molar excess of epichlorohydrin and an aromatic polyhydroxy compound; i.e., isopropylidene bisphenol, novolak, resorcinol, etc. The epoxy derivatives of ethylene or isopropylidene bisphenols are especially preferred.

A widely-used class of polyepoxides which are useful according to the instant invention includes the resinous epoxy polyethers obtained by reacting an epihalohydrin, such as epichlorohydrin, etc., with either a polyhydric phenol or a polyhydric alcohol. An illustrative, but by no means exhaustive, listing of suitable dihydric phenols includes 4,4'-isopropylidene bisphenol, 2,4'-dihydroxydiphenylethylmethane, 3,3'-dihydroxydiphenyldiethylmethane, 3,4'-diphenylmethylpropylmethane, etc.

Among the polyhydric alcohols which can be co-reacted with an epihalohydrin to provide these resinous epoxy polyethers are such compounds as ethylene glycol, propylene glycols, butylene glycols, pentane diols, bis(4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyhydric thioethers, etc.

An epoxy resin which may be cured by the process of this invention, the use of which is demonstrated in Examples 1-6, is one prepared, for example, by the reaction of Bisphenol A with epichlorohydrin in the presence of sodium hydroxide. After condensation is complete, the crude resin is freed of residual epichlorohydrin, washed well to remove salt and soluble by-products and recovered. Among those which have been employed to demonstrate the effectiveness of the instant invention are diglycidyl ethers of Bisphenol A, such as liquid epoxy resin which has a molecular weight of approximately 380, a functionality of approximately 2, and an equivalent weight of approximately 185-192.

Optionally, the epoxy resin formulations of the instant invention can include an "accelerator" to speed the amine cure of the epoxy resin, especially at ambient temperatures. In several applications, such acceleration is beneficial, especially when an epoxy resin is used as an adhesive in a flammable environment, thus making elevated temperature cure inconvenient or even hazardous. Lee, H. and Neville, K., HANDBOOK OF EPOXY RESINS, pp. 7-14, describes the use of certain amine-containing compounds as epoxy curing agent accelerators.

Many accelerators are known in the art which can be utilized in accordance with the instant invention. Examples include salts of phenols, salicylic acids, amine salts of fatty acids, such as those disclosed in U.S. Pat. No.

2,681,901, and tertiary amines such as those disclosed in U.S. Pat. No. 2,839,480, incorporated herein by reference.

It will further be realized that various conveniently employed additives can be admixed with the polyepoxide-containing composition of the instant invention prior to final cure. For example, in certain instances it may be desirable to add minor amounts of hardeners along with various other accelerators and curing agent systems well-known in the art. Additionally, conventional pigments, dyes, fillers, flame-retarding agents and the like which are compatible and natural or synthetic resins can be added.

The preparation of a cured epoxy resin is carried out in the following manner:

Epoxy resin is normally used without dilution and without other additives.

A solvent may be used where components are very viscous.

To a component containing the epoxy resin is added an equivalent amount of HEIMD-containing polyetherdiamine alone or in combination with a polyoxyalkylenediamine. The mixture is then mixed, degassed and poured into molds.

The HEIMD-containing polyetherdiamines or blends, where mixed with other amine curatives, should be present in the epoxy resin in an amount sufficient to provide about 0.8 to 1.2 amino (NH$_2$) groups per oxirane group of the epoxy resin.

In the various Examples the following terms are used to describe properties measured:

HDT—(ASTM D648-72) Heat distortion temperature is the temperature at which a polymer sample distorts under load upon heating under specified conditions. HDTs can also be used to indicate the degree of cross-linking or extent of cure of an epoxy resin.

Shore D hardness—(ASTM D-2240-81) Measured at 0 and at 10 seconds indentation hardness with durometer.

Izod impact strength (ft-lb/in) (ASTM D256-81)—Izod impact testing is carried out with the pendulum-type device where the test specimen is positioned as a cantilever beam with the notched side facing the striker. Five samples are tested for impact with each formulation with the average being recorded as IZOD impact strength.

Tensile Strength, psi (ASTM D638-80)—The rupture strength (stress/strain product at break) per unit area of material subjected to a specified dynamic load. "Ultimate tensile strength" is the force, at break, when a sample is pulled apart.

Tensile Modulus, psi—Stress/strain

Flexural Strength, psi (ASTM D790-80)—A measure of the ability of a material to withstand failure due to bending.

$$\text{Flexural Modulus, psi} = \frac{\text{Stress (psi)}}{\text{Strain (in/in)}}$$

Elongated at break, %

All parts are measured by weight.

It is understood the following examples are only intended to illustrate the invention and that the invention is not meant to be limited thereby.

EXAMPLE 1

| Properties of Epoxy Resin Systems Cured with Various Aminated Alkoxylated 1-2'-Hydroxyethyl-2-Imidazolidones (HEIMD) | | | | |
|---|---|---|---|---|
| Formulation | 6913-31A | 6913-31B | 6913-31A | 6913-76C |
| Liquid epoxy resin (EEW 185-192) | 100 | 100 | 100 | 100 |
| Aminated alkoxylated HEIMD 4 EO/2 PRO; eq. wt. ~135 | 73 | — | — | — |
| Aminated propoxylated HEIMD 5 PRO; eq. wt. ~105 | — | 57 | — | — |
| Aminated propoxylated HEIMD 10 PRO; eq. wt. ~170 | — | — | 92 | — |
| Aminated alkoxylated HEIMD 10 EO/3 PRO; eq. wt. ~185 | — | — | — | 100 |
| Properties: Cured ⅛-inch Castings cured: 2 hours 80°, 3 hours 125° C. | | | | |
| Shore D hardness, 0-10 sec. | 65-46 | 85-83 | 72-60 | 38-25 |
| HDT, °C., 264 psi | 22.1 | 68.8 | 26.2 | — |
| Izod impact strength, ft-lb/in | 13.5 | 2.2 | 11.6 | — |
| Tensile strength, psi | 730 | 9500 | 1420 | 430 |
| Tensile modulus, psi | 2730 | 460000 | 46100 | — |
| Elongation at break, % | 163 | 7.1 | 140 | 71 |
| Flexural strength, psi | 97 | 16300 | 230 | — |
| Flexural modulus, psi | 1420 | 448000 | 1420 | — |

Comments: Variations in structure and molecular weight of the subject polyetheramines result in cured epoxy resin systems with quite variable physical properties. An epoxy resin cured with any of the subject polyetheramines developed variable properties dependent largely on amine molecular weight. Properties varied in the degree of flexibility and resistance to applied tensile and flexural forces. A degree of toughness (resistance to impact) and flexibility (elongation; modulus) that are not normally achieved with epoxy systems were demonstrated with several of the subject polyetheramine cured systems. EO represents ethylene oxide and PRO represents propylene oxide. The polyetheramine prepared solely from propylene oxide (6913-31B), although of higher equivalent weight than an amine containing both propylene and ethylene oxide (6913-31A), produced a cured resin with considerably higher modulus, indicating that better physical properties might be expected with polyetheramines prepared solely from propylene oxide rather than those containing both propylene and ethylene oxide.

EXAMPLE 2

| Comparison of Properties: Epoxy Resin Systems Cured with Aminated Alkoxylated 1-2'-Hydroxyethyl-2-Imidazolidone (HEIMD) vs. Commercial Polyetheramine | | |
|---|---|---|
| Formulation | 6913-94A | 6914-32C |
| Liquid epoxy resin (EEW 185-192) | 100 | 100 |
| Aminated propoxylated HEIMD[1] 5 PRO; eq. wt. ~105 | 57 | — |
| JEFFAMINE ® D-400[2] Eq. wt. ~102 | — | 55 |
| Properties: Cured ⅛-inch Castings | | |
| cured: 2 hours 80°, 3 hours 125° C. | | |
| Shore D hardness, 0-10 sec. | 85-83 | 81-79 |
| HDT, °C., 264 psi | 68.8 | 42.2 |
| Izod impact strength, ft-lb/in | 2.2 | 1.1 |
| Tensile strength, psi | 9500 | 7500 |
| Tensile modulus, psi | 460000 | 479000 |
| Elongation at break, % | 7.1 | 4.1 |
| Flexural strength, psi | 16300 | 13400 |
| Flexural modulus, psi | 448000 | 434000 |
| % wt gain, | | |
| 24-hr water boil | 4.3 | 3.0 |
| 3-hr acetone boil | 9.6 | 31.3 |

[1] Structure:

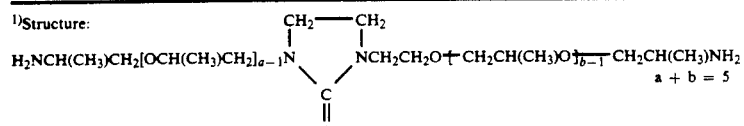

$H_2NCH(CH_3)CH_2[OCH(CH_3)CH_2]_{a-1}N\diagup^{CH_2-CH_2}_{\diagdown C\diagup}NCH_2CH_2O(CH_2CH(CH_3)O)_{b-1}CH_2CH(CH_3)NH_2$ $a + b = 5$ where the ring contains C=O.

[2] Structure: $H_2NCH(CH_3)CH_2[OCH_2CH(CH_3)]_xNH_2$ (x = 5.6)

Comments: Comparison of physical properties obtained on curing with the HEIMD-containing polyetheramine and a polyetheramine of quite similar equivalent weight, JEFFAMINE D-400, are shown. Cured properties obtained with the HEIMD-containing amine are clearly superior in a number of significant properties. HDT, impact, tensile and flexural strength and elongation values were higher for the HEIMD-containing polyether. The system cured with the HEIMD-amine was slightly less resistant to boiling water but was considerably improved in resistance to boiling acetone, a measure of solvent or chemical resistance. These improvements in properties also were noted in systems cured with variable amounts of curative. Results are shown in Examples 2a.-2c.

EXAMPLE 2a

| Heat Deflection Temperature vs. Stoichiometry: HEIMD Amine vs. JEFFAMINE ® D-400 (AHEW ~ 102-105) | | | | | |
|---|---|---|---|---|---|
| | Percent of Stoichiometry | | | | |
| | 80 | 90 | 100 | 110 | 120 |
| Amin. propoxyl. HEIMD (5 PRO; eq. wt ~ 105) | 53.2 | 61.8 | 68.0 | 63.3 | 55.0 |
| JEFFAMINE D-400 (eq. wt. ~ 102) | 27.6 | 35.3 | 42.2 | 44.1 | 39.6 |

Comments. The HEIMD-containing polyetheramine as an epoxy resin curative, provided cured systems over a wide concentration range that were considerably improved in heat resistance over those cured with a commercial polyetheramine.

EXAMPLE 2b

| Tensile Strength vs. Stoichiometry: HEIMD Amine vs. JEFFAMINE ® D-400 (AHEW ~ 102-105) | | | | | |
|---|---|---|---|---|---|
| | Percent of Stoichiometry | | | | |
| | 80 | 90 | 100 | 110 | 120 |
| Amin. propoxyl. HEIMD (5 PRO; eq. wt ~ 105) | 10150 | 10100 | 9600 | 9300 | 9000 |
| JEFFAMINE D-400 (eq. wt. ~ 102) | 2100 | 5900 | 7500 | 6900 | 6300 |

Comment: Systems cured with HEIMD-containing amine exhibited considerably higher tensile strength over a wide concentration range than did a similar commercial polyetheramine.

EXAMPLE 2c

| Solvent Resistance[1] vs. Stoichiometry: HEIMD Amine vs. JEFFAMINE ® D-400 (AHEW ~ 102-105) | | | | | |
|---|---|---|---|---|---|
| | Percent of Stoichiometry | | | | |
| | 80 | 90 | 100 | 110 | 120 |
| Amin. propoxyl. HEIMD (5 PRO; eq. wt ~ 105) | 28.47 | 15.03 | 9.38 | 10.67 | 16.00 |
| JEFFAMINE D-400 (eq. wt. ~ 102) | 56.62 | 46.26 | 31.31 | 23.32 | 27.68 |

[1] Measured by weight gain of 2.5 × 0.5 × 0.125-in. samples after boiling in acetone for three hours.

Comment: The epoxy resin system cured with HEIMD-containing polyetheramine was considerably more resistant to attack by boiling acetone than were formulations cured with a commercial polyetheramine. This was shown throughout a wide curative concentration range.

EXAMPLE 3

| Comparison of Properties: Epoxy Resin Systems Cured with Aminated Alkoxylated 1-2'-Hydroxyethyl-2-Imidazolidones (HEIMD) vs. Commercial Polyetheramine Blend | | |
|---|---|---|
| Formulation | 6913-59A | 6913-60A |
| Liquid epoxy resin (EEW 185-192) | 100 | 100 |
| Aminated alkoxylated HEIMD 10 PRO; eq. wt. ~ 170 | 92 | — |
| JEFFAMINE ® D-400/D-2000 Blend 50/50 pbw.; eq. wt. ~ 174 | — | 94 |

| Comparison of Properties: Epoxy Resin Systems Cured with Aminated Alkoxylated 1-2'-Hydroxyethyl-2-Imidazolidones (HEIMD) vs. Commercial Polyetheramine Blend | | |
|---|---|---|
| Formulation | 6913-59A | 6913-60A |
| Properties: Cured ⅛-inch Castings cured: 2 hours 80°, 3 hours 125° C. | | |
| Shore D hardness, 0–10 sec. | 69–60 | 47–30 |
| HDT, °C., 264 psi | 22.7 | 23.1 |
| Izod impact strength, ft-lb/in | 11.3 | 8.7 |
| Tensile strength, psi | 1330 | 430 |
| Tensile modulus, psi | 16700 | 1030 |
| Elongation at break, % | 141 | 54.5 |
| Flexural strength, psi | 350 | 120 |
| Flexural modulus, psi | 29200 | 1480 |
| % wt gain, 24-hr water boil | 4.6 | 3.2 |
| 3-hr acetone boil | 38.6 | 46.4 |
| Tear strength, pli | 162 | 38 |

Comment: When compared with a system cured with a blend of commercial polyetheramines (JEFFAMINE D-400/D-2000) of matching equivalent weight, the formulation cured with the HEIMD-containing polyetheramine was clearly superior in strength and flexibility. Higher impact strength, elongation and resistance to acetone boil (chemical resistance) were features of the HEIMD-amine cure.

EXAMPLE 3a

| Total Impact Energy vs. Stoichiometry: HEIMD Amine vs. JEFFAMINE ® D-400/D-2000 (AHEW ~ 102–105) | | | | | | |
|---|---|---|---|---|---|---|
| | Percent of Stoichiometry | | | | | |
| | 80 | 90 | 100 | 110 | 120 | 130 |
| Amin. propoxyl. HEIMD (10 PRO; eq. wt ~170) | 152 | 166 | 180 | 192 | 174 | 136 |
| JEFFAMINE D-400/D-2000 blend (50/50 pbw; eq. wt. ~174) | 66 | 105 | 124 | 114 | — | — |

Comment: Values for total energy required for catastrophic failure as measured by the Dynatap falling dart impact test (ASTM D-3763) were considerably higher for the HEIMD-containing polyetheramine than for the system cured with a blend of commercial polyetheramines or equivalent weight. This is an indication of a higher degree of toughness of the system cured with the HEIMD-amine. Although values maximized at 100–110% of stoichiometry, impact values were quite high over the total range tested.

EXAMPLE 4

| Properties of Epoxy Resin Systems Cured with HEIMD-Containing Polyetheramine (AHEW[1]) ~ 108) and JEFFAMINE ® D-400 (AHEW ~ 105) | | |
|---|---|---|
| Formulation | 6974 2C | 6974-32C |
| Liquid epoxy resin (EEW 185-192) | 100 | 100 |
| Aminated propoxylated HEIMD (5 PRO) | 57 | — |
| JEFFAMINE ® D-400 | — | 55 |
| Properties: Cured ⅛-inch Castings cured: 2 hours 80°, 3 hours 125° C. | | |
| Shore D hardness, 0–10 sec. | 85–83 | 81–79 |
| HDT, °C., 264 psi | 68.0 | 42.2 |
| Izod impact strength, ft-lb/in | 2.2 | 1.1 |
| Tensile strength, psi | 9600 | 7500 |
| Tensile modulus, psi | 460000 | 479000 |
| Elongation at break, % | 8.0 | 4.1 |
| Flexural strength, psi | 16600 | 13400 |
| Flexural modulus, psi | 453000 | 434000 |
| % wt gain, 24-hr water boil | 4.3 | 3.0 |
| 3-hr acetone boil | 9.4 | 31.3 |

Comments: A stronger, more flexible cured epoxy system was prepared with the HEIMD-polyetheramine as curative than was possible with JEFFAMINE ® D-400. Areas of considerable improvement were shown in heat resistance (HDT) and weight gain with boiling acetone (chemical resistance). The HEIMD-containing system was slightly more sensitive to moisture (weight gain with water boil) than was the formulation cured with JEFFAMINE ® D-400.

EXAMPLE 5

| Properties of Epoxy Resin System Cured with HEIMD-Containing Polyetheramine (AHEW~170), JEFFAMINE ® D-400/D-2000 Blend (AHEW~174) and JEFFAMINE ® DU-700 (AHEW~219) | | | |
|---|---|---|---|
| Formulation | 6913-59A | 6913-60A | 6913-45A |
| Liquid epoxy resin (EEW 185-192) | 100 | 100 | 100 |
| Aminated propoxylated HEIMD (10 PRO) | 92 | — | — |
| JEFFAMINE ® D-400/D-2000 Blend (50/50 pbw.)- | — | 94 | — |
| JEFFAMINE ® DU-700 | — | — | 118.5 |
| Properties: Cured ⅛-inch Castings cured: 2 hours 80°, 3 hours 125° C. | | | |
| Shore D hardness, 0–10 sec. | 69–60 | 47–30 | 63–47 |
| HDT, °C., 264 psi | 22.7 | 23.1 | — |
| Izod impact strength, ft-lb/in | 11.3 | 8.7 | — |
| Tensile strength, psi | 1330 | 430 | 780 |
| Tensile modulus, psi | 16700 | 1030 | 5650 |
| Elongation at break, % | 140.9 | 54.5 | 94.5 |
| Flexural strength, psi | 350 | 120 | — |
| Flexural modulus, psi | 29200 | 1480 | — |
| % wt gain, 24-hr water boil | 4.6 | 3.2 | 1.2 |
| 3-hr acetone boil | 38.6 | 46.4 | 43.8 |
| Tear strength, pli | 162 | 38 | 88 |

Comments: When compared with a system cured with a blend of JEFFAMINE ® D-400 and D-2000 of matching equivalent weight, the formulation cured with the HEIMD-containing polyetheramine was clearly superior in strength and flexibility. Higher impact strength, elongation and resistance to acetone boil (chemical resistance) were features of the HEIMD-amine cure. When compared to a product similar in structure JEFFAMINE ® DU-700, again strength properties and elongation favor the HEIMD amine cured system. DU-700 is a type of urea condensate of a polyoxypropylenepolyamine. See Texaco Chemical Company New Product Development Bulletin NPD-005. DU-700 is known to develop tough, impact resistance cured systems.

What is claimed is:
1. An epoxy resin composition comprising:
   a) a diglycidyl ether of Bisphenol A having an epoxy equivalent weight of (EEW) 185 to 192, and an amount sufficient to provide
   b) about 0.8 to 1.2 amino groups per oxirane group of an aminated propoxylated derivative of 1,2'-hydroxyethyl-2-imidazolidone (HEIMD) represented by the following:

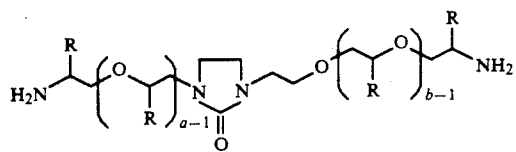

wherein R is methyl and a+b=n, wherein n is a number from about 2 to 80, wherein the derivative has an equivalent weight of from about 105 to 185.

2. The composition of claim 1, cured at a temperature from about 20° C. to 150° C. for up to ten hours.

3. The composition of claim 1, cured at a temperature about 150° C.

4. The composition of claim 1, cured at a temperature in the range of 70° C. to 90° for up to about 3 hours and subsequently cured at a temperature of from about 110° C. to 130° C. for an additional period of up to about 2 hours.

* * * * *

UNITED STATES PATENT AND TRADEMARK OFFICE
CERTIFICATE OF CORRECTION

PATENT NO. : 5,250,632

DATED : October 5, 1993

INVENTOR(S) : Harold George Waddill, Wei-Yang Su,
Michael (NMN) Cuscurida, and Terry Lee Renken It is certified that error appears in the above-identified patent and that said Letters Patent is hereby corrected as shown below:

Claim 1, column 12, line 7, delete "about" and insert --above--.

Signed and Sealed this

Fifth Day of April, 1994

BRUCE LEHMAN

Attest:

*Attesting Officer*     *Commissioner of Patents and Trademarks*